(12) United States Patent
Feigleson et al.

(10) Patent No.: US 9,731,388 B2
(45) Date of Patent: Aug. 15, 2017

(54) METHOD AND FIXTURE FOR AIRFOIL ARRAY ASSEMBLY

(71) Applicant: United Technologies Corporation, Hartford, CT (US)

(72) Inventors: Steven J. Feigleson, Falmouth, ME (US); Dennis R. Tremblay, Biddeford, ME (US); Michael E. McMahon, Shapleigh, ME (US); Nathan C. Johnson, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/955,337

(22) Filed: Dec. 1, 2015

(65) Prior Publication Data

US 2016/0084094 A1    Mar. 24, 2016

Related U.S. Application Data

(62) Division of application No. 13/626,929, filed on Sep. 26, 2012.

(51) Int. Cl.
| | |
|---|---|
| *B23P 15/04* | (2006.01) |
| *B23P 15/06* | (2006.01) |
| *F01D 9/04* | (2006.01) |
| *F01D 25/28* | (2006.01) |

(52) U.S. Cl.
CPC ............ *B23P 15/04* (2013.01); *B23P 15/06* (2013.01); *F01D 9/04* (2013.01); *F01D 9/041* (2013.01); *F01D 25/285* (2013.01); *F05D 2230/60* (2013.01); *F05D 2230/68* (2013.01); *F05D 2230/70* (2013.01); *Y10T 29/49323* (2015.01); *Y10T 29/53961* (2015.01)

(58) Field of Classification Search
CPC combination set(s) only.
See application file for complete search history.

(56) References Cited

U.S. PATENT DOCUMENTS

| | | | |
|---|---|---|---|
| 3,636,609 A * | 1/1972 | Stahl | B23P 15/006 269/303 |
| 5,232,340 A | 8/1993 | Morgan | |
| 5,281,089 A | 1/1994 | Brown et al. | |
| 5,380,155 A | 1/1995 | Varsik et al. | |
| 5,494,404 A | 2/1996 | Furseth et al. | |
| 5,547,342 A | 8/1996 | Furseth et al. | |

(Continued)

*Primary Examiner* — Larry E Waggle, Jr.
*Assistant Examiner* — Alvin Grant
(74) *Attorney, Agent, or Firm* — Carlson, Gaskey & Olds, P.C.

(57) ABSTRACT

An example method of assembling a turbomachine airfoil array includes, among other things, securing a partial airfoil array within a fixture, the partial airfoil array having at least one existing airfoil extending radially between an inner and an outer fairing and an open area where at least one existing airfoil has been removed. The method includes mounting a positioning saddle relative to a base of the fixture, the positioning saddle aligned with the open area, holding a replacement airfoil using the positioning saddle, applying a curable material at an interface between the replacement airfoil and the inner and outer fairing, and curing the curable material while maintaining a relative position between the replacement airfoil and the inner and outer fairing.

19 Claims, 8 Drawing Sheets

(56) References Cited

U.S. PATENT DOCUMENTS

| | | | | |
|---|---|---|---|---|
| 5,758,416 A | * | 6/1998 | Reverman | B23P 6/005 29/889.1 |
| 6,202,302 B1 | | 3/2001 | Descoteaux | |
| 6,409,472 B1 | | 6/2002 | McMahon et al. | |
| 6,425,736 B1 | * | 7/2002 | McMahon | F01D 9/042 415/173.4 |
| 6,543,995 B1 | | 4/2003 | Honda et al. | |
| 6,575,702 B2 | * | 6/2003 | Jackson | B23P 6/005 29/402.13 |
| 6,589,033 B1 | * | 7/2003 | Johnson | F01C 11/004 418/13 |
| 6,908,288 B2 | * | 6/2005 | Jackson | F01D 5/005 29/889.1 |
| 6,910,859 B2 | | 6/2005 | Bluhm et al. | |
| 7,413,400 B2 | | 8/2008 | Barnett | |
| 7,491,030 B1 | * | 2/2009 | Pinera | F01D 5/147 415/161 |
| 7,494,316 B2 | | 2/2009 | Barnett et al. | |
| 7,637,718 B2 | | 12/2009 | Barnett et al. | |
| 7,934,302 B2 | | 5/2011 | Kalmar et al. | |
| 8,562,302 B2 | | 10/2013 | Bakhuis et al. | |
| 2005/0091848 A1 | * | 5/2005 | Nenov | B23P 6/005 29/889.1 |
| 2005/0109816 A1 | * | 5/2005 | Swartzbeck | B23K 37/0435 228/44.3 |
| 2006/0104810 A1 | * | 5/2006 | Hagle | B23K 1/0018 415/210.1 |
| 2010/0050434 A1 | * | 3/2010 | Long | F01D 5/005 29/889.1 |
| 2010/0166545 A1 | | 7/2010 | Schuler et al. | |
| 2010/0272565 A1 | | 10/2010 | Cheung | |
| 2012/0189438 A1 | | 7/2012 | Feigleson et al. | |
| 2012/0216402 A1 | * | 8/2012 | Krizansky | B23K 11/002 29/889.1 |
| 2013/0014389 A1 | | 1/2013 | Feigleson et al. | |
| 2013/0230403 A1 | * | 9/2013 | Sassatelli | B23P 6/005 416/223 R |
| 2014/0079540 A1 | * | 3/2014 | Morris | B22F 3/1055 415/178 |
| 2015/0337799 A1 | * | 11/2015 | Hansen | F03D 1/005 410/44 |

\* cited by examiner

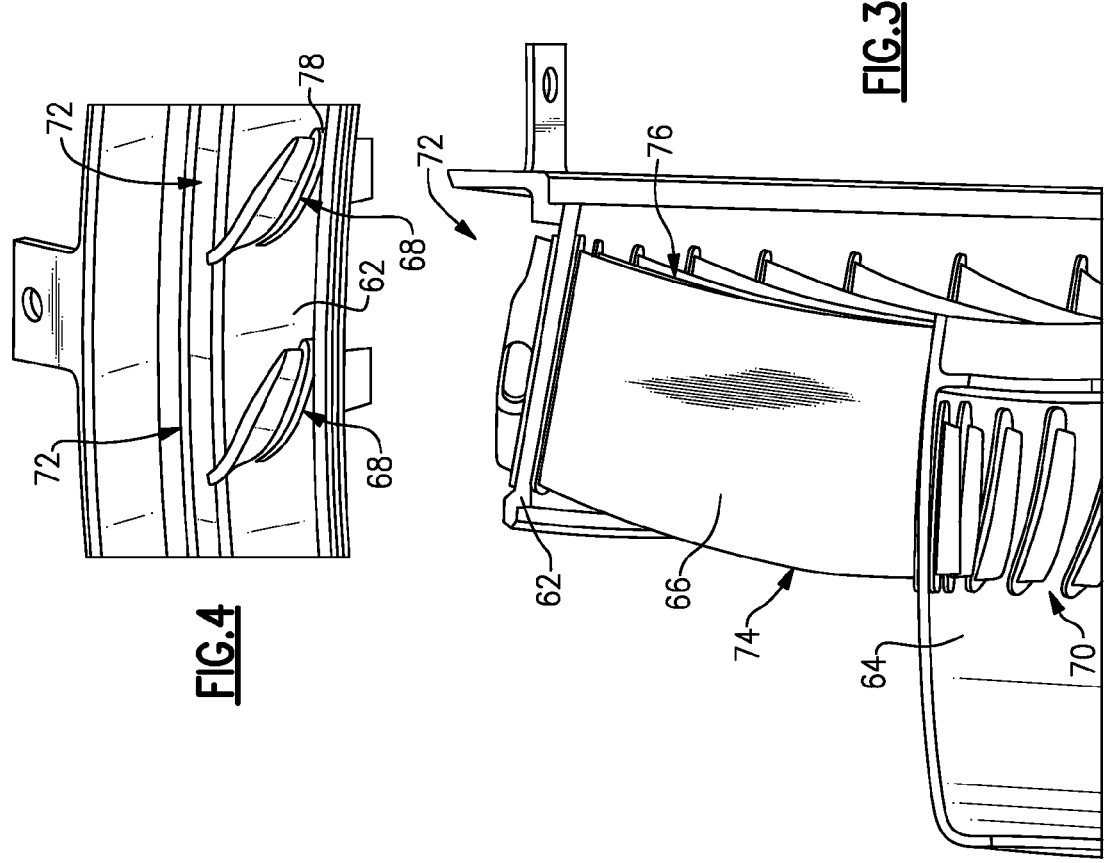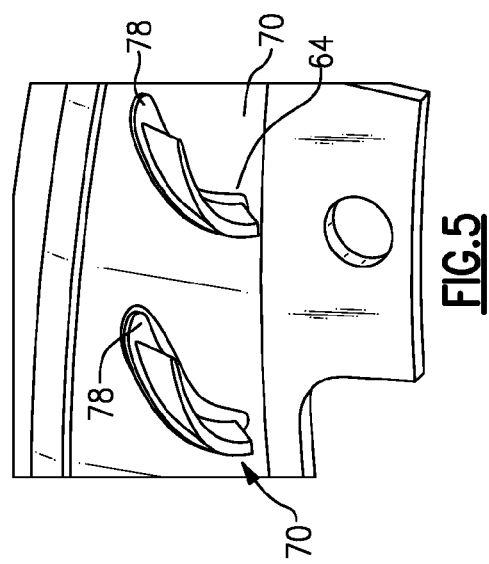

METHOD AND FIXTURE FOR AIRFOIL ARRAY ASSEMBLY

CROSS-REFERENCE TO RELATED APPLICATIONS

This application is a divisional of U.S. application Ser. No. 13/626,929, which was filed on 26 Sep. 2012 and is incorporated herein by reference.

BACKGROUND

This disclosure relates generally to a method of airfoil array assembly and, more particularly, to a fixture that locates selected airfoils during assembly.

Turbomachines, such as a gas turbine engines, typically include a fan section, and a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high-pressure compressors, and the turbine section includes low and high-pressure turbines.

The high-pressure turbine drives the high-pressure compressor through an outer shaft to form a high spool, and the low pressure turbine drives the low-pressure compressor through an inner shaft to form a low spool. A direct drive gas turbine engine includes a fan section driven by the low spool such that the low-pressure compressor, low-pressure turbine, and fan section rotate at a common speed in a common direction. A speed reduction device such as an epicyclical gear assembly may be utilized to drive the fan section such that the fan section may rotate at a speed different than the turbine section so as to increase the overall propulsive efficiency of the engine.

Some front architectures support the stator vanes relative to inner and outer fairings using rubber potting. Because there are no fixed features or fasteners used to secure vanes within the fairings, assembly can be difficult and time consuming. Replacing potted vanes in an existing assembly during repair, for example, is also difficult and complex. Alignment features in the existing assembly may make loading a partial airfoil array difficult.

SUMMARY

A method of assembling a turbomachine airfoil array according to an exemplary aspect of the present disclosure includes, among other things, securing a partial airfoil array within a fixture, the partial airfoil array having at least one existing airfoil extending radially between an inner and an outer fairing and an open area where at least one existing airfoil has been removed. The method includes mounting a positioning saddle relative to a base of the fixture, the positioning saddle aligned with the open area, holding a replacement airfoil using the positioning saddle, applying a curable material at an interface between the replacement airfoil and the inner and outer fairing, and curing the curable material while maintaining a relative position between the replacement airfoil and the inner and outer fairing.

In a further non-limiting embodiment of the foregoing method of assembling, the replacement airfoil may be a stator vane.

In a further non-limiting embodiment of either of the foregoing methods of assembling, the method may include positioning the replacement airfoil vanes by defining a first plane with at least two contact points on the positioning saddle, defining a second plane with at least two contact points on the positioning saddle, and defining at least a portion of a third plane with at least one contact point on the positioning saddle.

In a further non-limiting embodiment of any of the foregoing methods of assembling, the positioning saddle may include a first portion and a separate, second portion, the first portion having the contact points defining the first and second planes, and the second portion having the at least one contact point defining the third plane.

In a further non-limiting embodiment of any of the foregoing methods of assembling, the positioning saddle may be selected from a group of positioning saddles, at least some of the positioning saddles within the group having contact points defining different first planes and different second planes.

In a further non-limiting embodiment of any of the foregoing methods of assembling, the fixture does not include positioning saddles associated with the at least one existing airfoil.

In a further non-limiting embodiment of any of the foregoing methods of assembling, the at least one existing airfoil may be held within the fixture during curing of the curable material.

In a further non-limiting embodiment of any of the foregoing methods of assembling, the positioning saddle may be configured to be selectively positioned at one of a plurality of circumferential positions.

In a further non-limiting embodiment of any of the foregoing methods of assembling, the fixture may provide unobstructed areas that accommodate the existing airfoils when the partial airfoil array is secured within the fixture, the unobstructed area lacking contact points defining planes for aligning airfoil vanes.

In a further non-limiting embodiment of any of the foregoing methods of assembling, the mounting may be before the securing.

A fixture for assembling a turbomachine airfoil array according to an exemplary aspect of the present disclosure includes, among other things, a base and a positioning saddle that is selectively mounted to the base, the positioning saddle configured to hold a replacement airfoil to maintain a relative position between the replacement airfoil and an inner and outer fairing when a curable material at an interface between the replacement airfoil and the inner and outer fairing is curing.

In a further non-limiting embodiment of the foregoing fixture, the replacement airfoil may be a stator vane.

In a further non-limiting embodiment of either of the foregoing fixtures, the positioning saddle holds the replacement airfoil by defining a first plane with at least two contact points, defining a second plane with at least two contact points, and defining at least a portion of a third plane with at least one contact point.

In a further non-limiting embodiment of any of the foregoing fixtures, the positioning saddle may include a first portion and a separate, second portion, the first portion having the contact points defining the first and second planes, and the second portion having the at least one contact point defining the third plane.

In a further non-limiting embodiment of any of the foregoing fixtures, the positioning saddle may be selected from a group of positioning saddles, at least some of the positioning saddles within the group having contact points defining different first planes and second planes.

In a further non-limiting embodiment of any of the foregoing fixtures, the fixture may provide unobstructed areas that accommodate the existing airfoils when the partial airfoil array is secured within the fixture, the unobstructed area lacking contact points defining planes for aligning airfoil vanes.

An airfoil positioner according to an exemplary aspect of the present disclosure includes, among other things, a positioning saddle that is selectively mountable to a base at one of a plurality of circumferential mounting locations. The positioning saddle configured to hold a replacement airfoil to maintain a relative position between the replacement airfoil and an inner and outer fairing when a curable material at an interface between the replacement airfoil and the inner and outer fairing is curing. The positioning saddle defining a first plane with at least two contact points, defining a second plane with at least two contact points, and defining at least a portion of a third plane with at least one contact point.

An airfoil positioner according to an exemplary aspect of the present disclosure includes, among other things, a first portion and a separate, second portion, the first portion having the contact points defining the first and second planes, and the second portion having the at least one contact point defining the third plane.

A method of assembling a turbomachine airfoil array according to yet another exemplary aspect of the present disclosure includes, among other things, securing a partial airfoil array within a fixture. The partial airfoil array has at least one existing airfoil extending radially between an inner fairing and an outer fairing, and an open area where at least one existing airfoil has been removed. The method further includes holding a replacement airfoil by defining a first plane with at least two contact points, applying a curable material at an interface between the replacement airfoil and the inner fairing and the outer fairing, and curing the curable material while maintaining a relative position between the replacement airfoil and the inner fairing and the outer fairing.

In a further non-limiting embodiment of the foregoing method of assembling, the holding comprises holding the replacement airfoil using a positioning saddle.

In a further non-limiting embodiment of any of the foregoing methods assembling, the positioning saddle includes a first portion and a separate, second portion, the first portion having the contact points defining the first and second planes, and the second portion having the at least one contact point defining the third plane.

In a further non-limiting embodiment of any of the foregoing methods assembling, the positioning saddle is selected from a group of positioning saddles, at least some of the positioning saddles within the group having contact points defining different first planes and different second planes.

In a further non-limiting embodiment of any of the foregoing methods assembling, the replacement airfoil is a stator vane.

In a further non-limiting embodiment of any of the foregoing methods assembling, the at least one existing airfoil is held within the fixture during curing of the curable material.

In a further non-limiting embodiment of any of the foregoing methods assembling, the positioning saddle is configured to be selectively positioned at one of a plurality of circumferential positions.

In a further non-limiting embodiment of any of the foregoing methods assembling, the fixture provides unobstructed areas that accommodate the existing airfoils when the partial airfoil array is secured within the fixture, the unobstructed area lacking contact points defining planes for aligning airfoil vanes.

In a further non-limiting embodiment of any of the foregoing methods assembling, the mounting is before the securing.

These and other features disclosed herein can be best understood from the following specification and drawings, the following of which is a brief description.

BRIEF DESCRIPTION OF THE DRAWINGS

FIG. 3 is a partial schematic view of vanes of the stator vane assembly of FIG. 2.

FIG. 4 is a perspective view of a top portion of the stator vane assembly of FIG. 2.

FIG. 5 is a bottom view of the stator vane assembly of FIG. 2.

DETAILED DESCRIPTION

Figure 1:
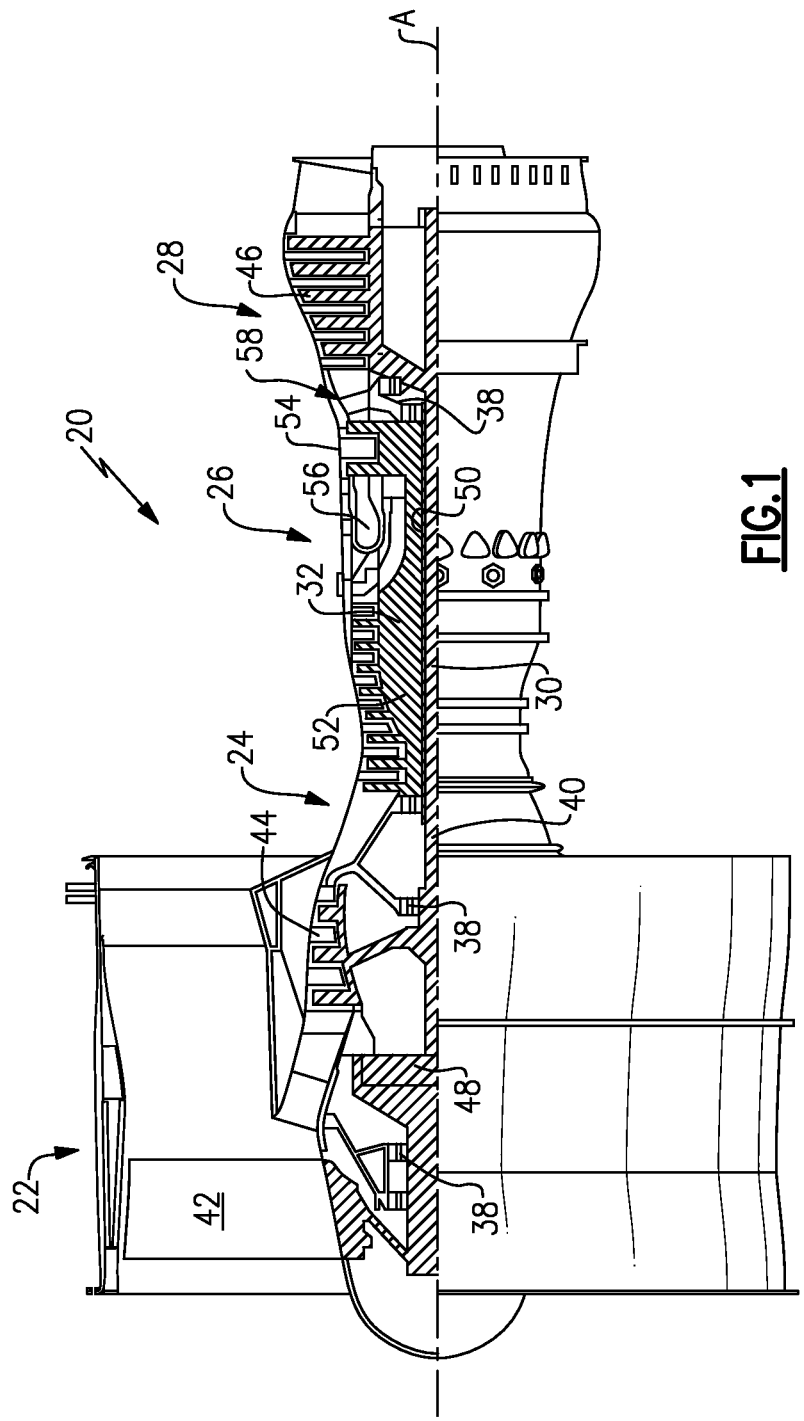
FIG. 1 is a schematic view of an example gas turbine engine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of $[(T_{ram}° R)/(518.7° R)]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
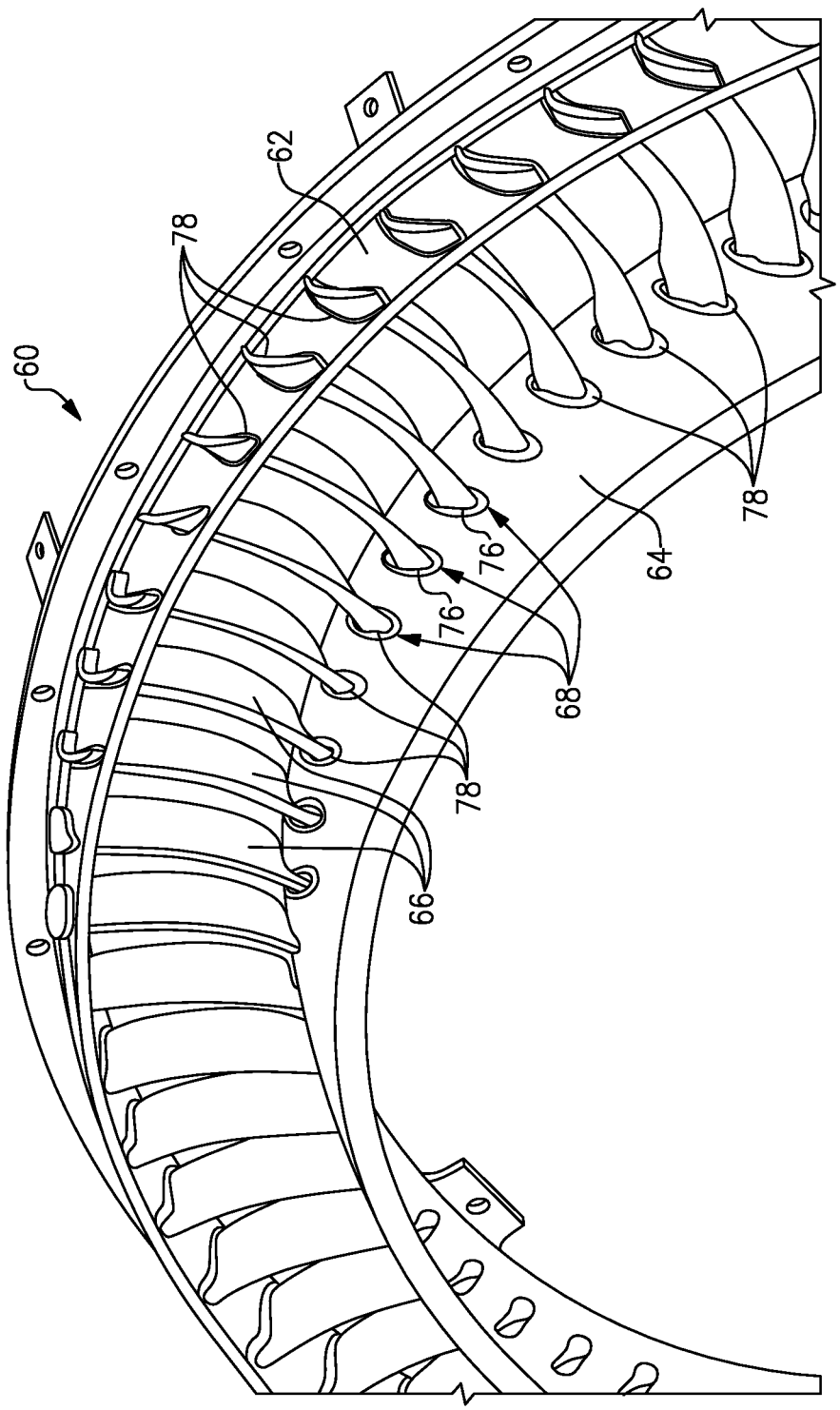
FIG. 2 is a perspective view of an example stator vane assembly.

Referring to the FIG. 2, the example low-pressure compressor 44 includes at least one a stator vane assembly 60 having an outer fairing 62, an inner fairing 64, and a plurality of stator vanes 66 extending radially therebetween.

The stator vane assembly 60 is an example airfoil array of the engine 20. Other arrays may include types of airfoils other than stator vanes, such as blades.

Referring to FIGS. 3, 4, and 5 with continued reference to FIG. 2, the stator vanes 66 are supported within openings 68 or slots defined within each of the inner and outer fairings 62 and 64. Each of the stator vanes 66 includes an inner end 70, an outer end 72, a leading edge 74, and a trailing edge 76. Each of the stator vanes 66 are supported within the openings 68 by a sealant 78. The example sealant 78 is a curable material that remains flexible once cured. The stator vanes 66 are mounted within the openings 68 by way of the curable sealant 78.

The sealant 78 provides a bonded joint between the inner and outer fairings 62 and 64. During assembly the sealant 78 is injected into the openings 68 and within gaps between each of the stator vanes 66 and the corresponding opening 68 to vibrationally isolate the outer and inner fairings 62 and 64 from the stator vanes 66.

It is the sealant 78, however, that provides the joint that maintains each of the vanes 66 in a desired position relative to the other stator vanes 66 and each of the outer and inner fairings 62 and 64. Initial assembly of the stator vane assembly 60 requires specific positioning of each of the stator vanes 66 within corresponding openings 68. Positioning within the openings 68 is provided such that the stator vanes 66 themselves do not engage the outer and inner fairings 62 and 64.

An initial assembly fixture typically includes various locators used to define and maintain a relative position between the plurality of stator vanes 66 and the outer and inner fairings 62 and 64 while the sealant 78 is applied and cured to form the completed stator vane assembly 60.

Since all the stator vanes 66 are sequentially positioned relative to the outer and inner fairings 62 and 64 during initial assembly, there is little drawback to interference between a fixture and stator vanes 66 during initial assembly.

Once assembled, the stator vane assembly 60 may be installed and used within the engine 20. Over time, some of the stator vanes 66 may become damaged and require replacement. It is difficult to reload the stator vane assembly 60 requiring repair into the same fixture used during initial assembly because, for example, the various locators may contact portions of the stator vane assembly 60 during loading.

Figure 6:
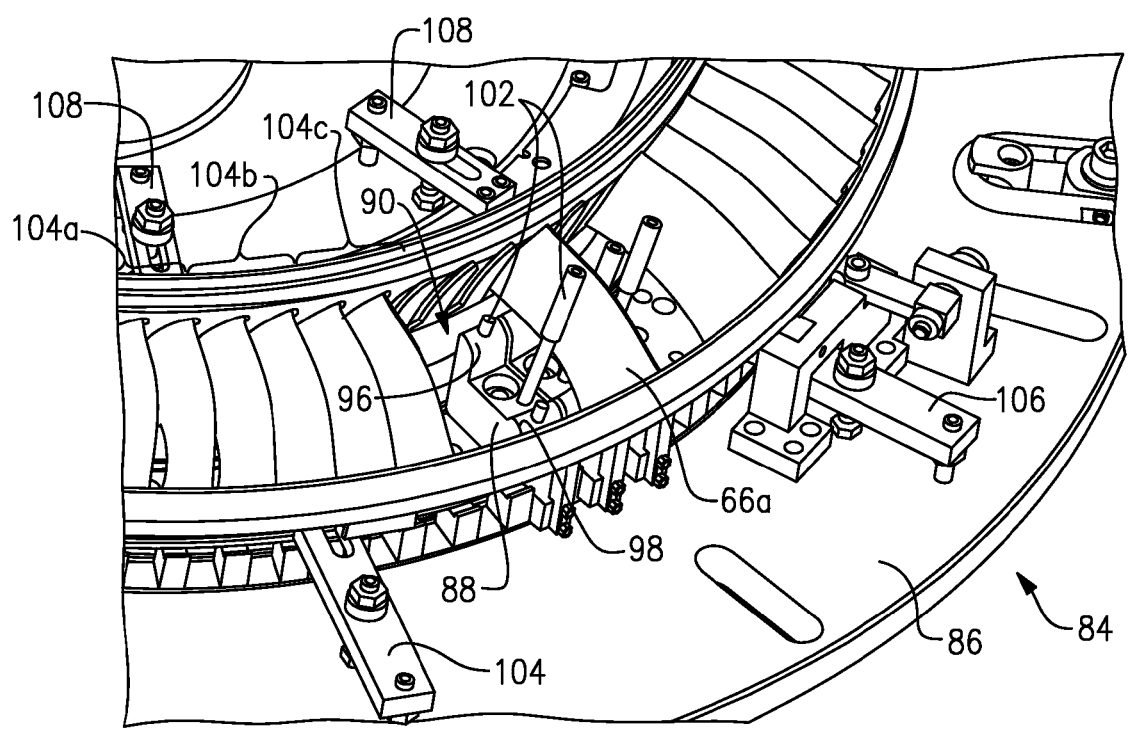
FIG. 6 is a perspective view of a portion of the stator vane assembly of FIG. 2 within an example assembly fixture.
Figure 7:
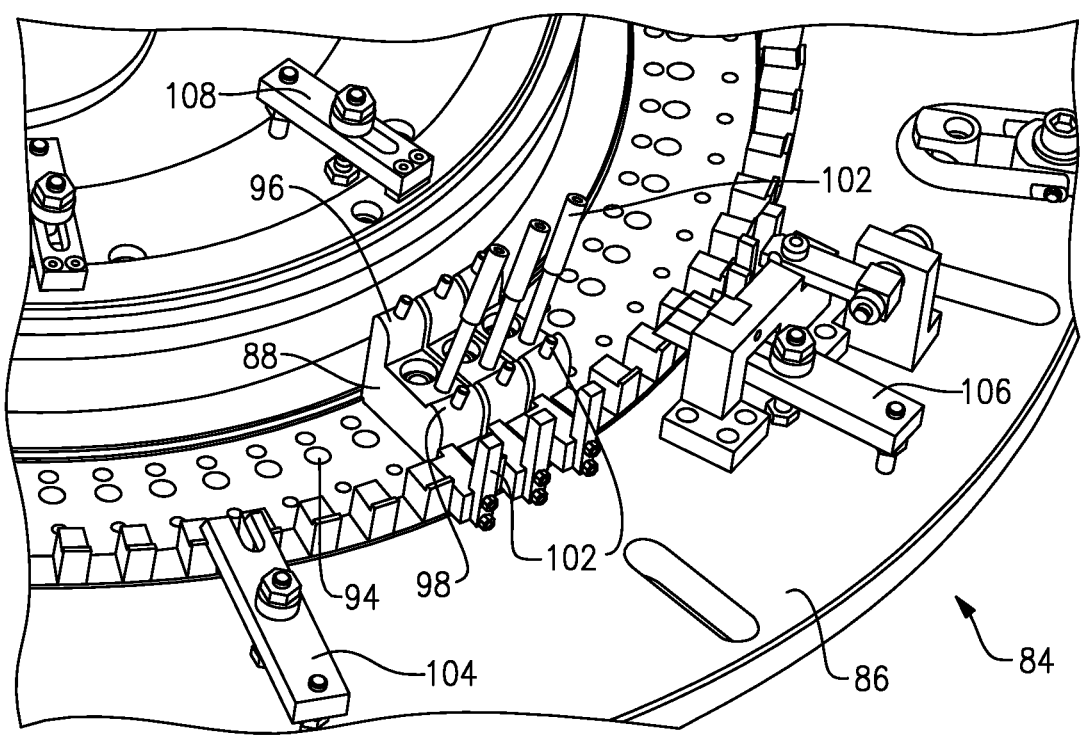
FIG. 7 is a perspective view of the assembly fixture of FIG. 6 with the stator vane assembly removed.
Figure 8:
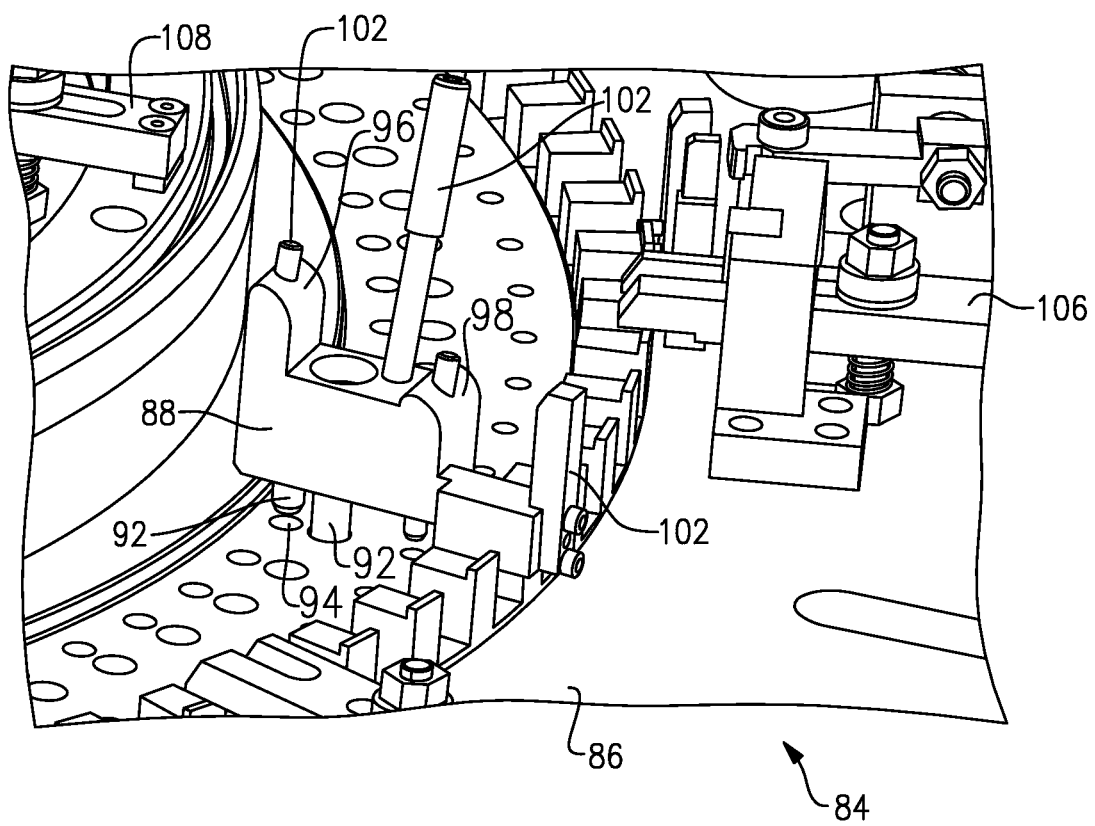
FIG. 8 is another perspective view of the assembly fixture of FIG. 6 with the stator vane assembly removed.

Referring to FIGS. 6-8, an example assembly fixture 84 used during a replacement procedure, for example, includes a base 86 that supports the outer fairing 62 and the inner fairing 64. The example fixture 84 includes positioning saddles 88 that are used to directly hold selected ones the plurality of stator vanes 66 in a desired position for assembly including the application and curing of the sealant 78 (FIGS. 4 and 5). The positioning saddles 88 are only used in association with the stator vanes 66 that are being attached to the outer and inner fairing 62 and 64. The positioning saddles 88 are absent from the areas of the fixture 84 that will accommodate other stator vanes 66 that are already attached to the outer and inner fairings 62 and 64.

As previously mentioned, some of the stator vanes 66 may become damaged or worn during use within the engine 20. To repair such a stator vane assembly 60, the stator vane assembly 60 is first removed from the engine 20. The damaged stator vanes 66 are then removed from the outer and inner fairings 62 and 64, which creates an open area 89 within the stator vane assembly 60. Existing vanes, those vanes that do not require replacement, remain part of the stator vane assembly 60. The stator vane assembly 60 with the removed vanes may be considered to provide a partial airfoil array.

The stator vane assembly 60 is then loaded into the fixture 84, and the open area 89 aligned with the positioning saddles 88. Each of the positioning saddles 88 then receives and holds one replacement stator vane 66a during application and curing of the sealant 78. The positioning saddles 88 are selectively mountable to various circumferential areas of the fixture 84. The positioning saddles 88, in this example, are mounted to the circumferential area corresponding to the open area 89 in the partially disassembled stator vane assembly 10.

In this example, no positioning saddles 88 are used other than those that will receive a replacement stator vane 66a. That is, positioning saddle are not mounted to the base 86 in areas of the fixture 84 that accommodate the existing stator vanes 66. The fixture 84 thus provides unobstructed areas that accommodate the existing stator vanes 66. The unobstructed areas lack contact points defining planes for aligning vanes. The fixture 84 can thus receive the stator vane assembly 60 without significant interference between the stator vanes 66 remaining in the stator vane assembly 60 and the portions of the fixture 84.

The example positioning saddles 88 provide the specific datum planes and points required to properly align each of the associated replacement stator vanes 66a relative to adjacent vanes and the outer and inner and fairings 62 and 64. In operation, the example fixture 84 having the positioning saddles 88 is utilized to define the relative position between the outer and inner fairings 62 and 64 prior to application of the sealant 78.

The sealant 78 is applied to secure the replacement stator vane 66a within the outer and inner fairings 62 and 64 and also to eliminate vibratory transmission between parts.

Although each positioning saddle 88 holds a single replacement stator vane 66a in this example, other examples may include positioning saddles configured to hold more than one replacement stator vane 66a.

In this example, the positioning saddles 88 include locator pins 92 that are received within respective apertures 94 of the base 86 to mount and locate the positioning saddle 88 relative to the base 86.

The example positioning saddles 88 have a radially inner hump 96 and a radially outer hump 98 that locate the replacement stator vane 66a during application and curing of the sealant. The positioning saddles 88 also include pins 102 that locate the stator vane 66a with the outer and inner fairings 62 and 64 in other directions. More specifically, the example positioning saddles 88 define a first plane with at least two contact points on the humps 96 and 98, define a second plane with at least two contact points on two of the pins 102, and define at least a portion of a third plane with at least one contact point on another of the pins 102.

In this example, the stator vane assembly 60 includes stator vanes 66 having three distinct orientations. These stator vanes 66 are arranged in groups 104a, 104b, and 104c. The fixture 84 thus includes three distinct types of positioning saddles 88 having humps 96 and 98 and pins 102 adjusted to hold the replacement stator vanes 66a in the desired one of the three orientations. Other examples may include more stator vane orientations and thus more positioning saddle variations.

When the stator vane assembly 60 is loaded within the fixture 84, the base 86 of the example fixture 84 provides an attachment location for clamps 106 that hold the outer fairing 62. The inner fairing 64 is supported on a radially inner portion of the base 86 and held in place by inner clamps 108.

Figure 9:
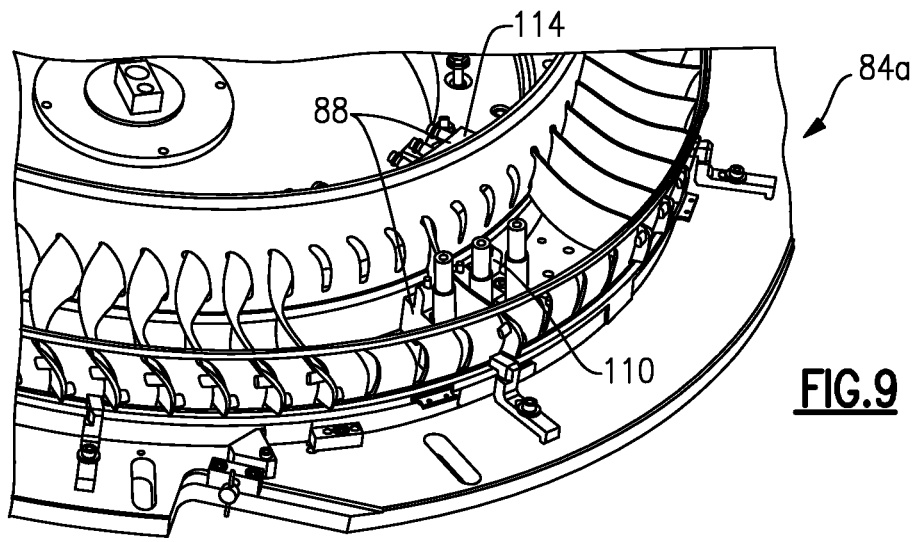
FIG. 9 is a perspective view of the portion of the example stator vane assembly of FIG. 6 within another example assembly fixture.
Figure 10:
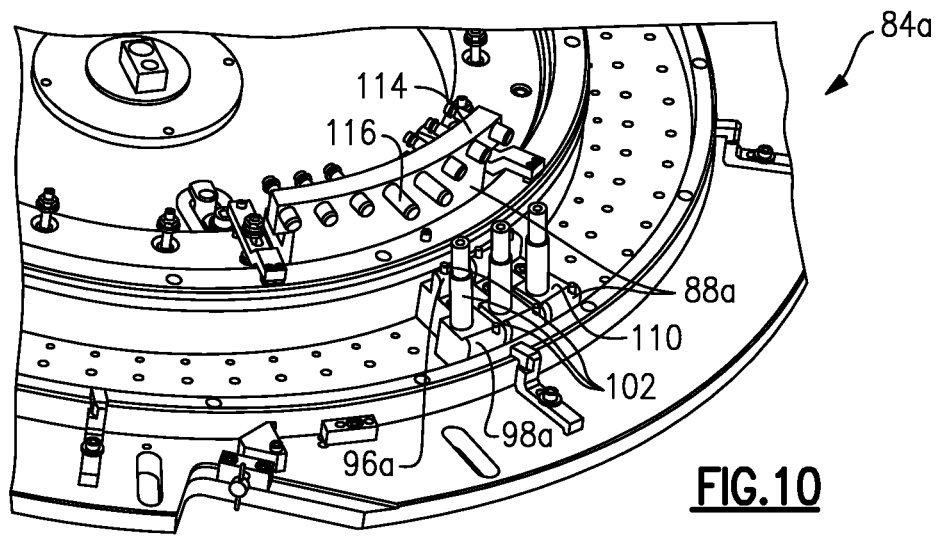
FIG. 10 is a perspective view of the assembly fixture of FIG. 9 with the stator vane assembly removed.
Figure 11:
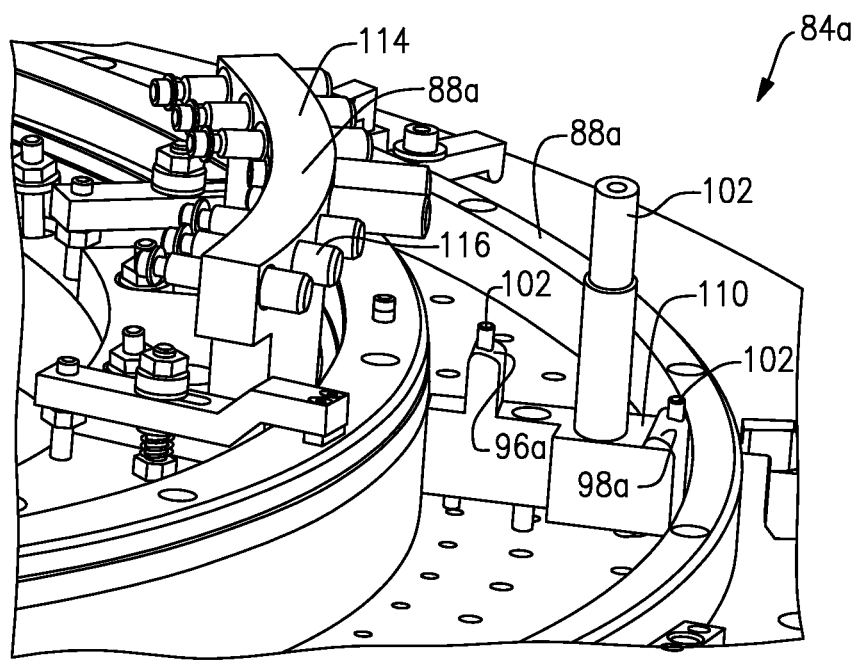
FIG. 11 is another perspective view of the assembly fixture of FIG. 9 with the stator vane assembly removed.

Referring to FIGS. 9-11, another example fixture 84a that may be used to hold the stator vane assembly 60 during, for example, a repair or replacement procedure, includes positioning saddles 88a having a first portion 110 and a second portion 114. The first portion includes a radially inner hump 96a and a radially outer hump 98a that locate the replacement stator vane 66a during replacement. The first portion 110 also includes three locator pins 102a used to locate the replacement stator vane in some directions. The second portion 114 includes a locator pin 116 that locates the replacement stator vane 66a in another direction, which is a radial direction in this example.

During a replacement, the replacement stator vane 66a is moved radially inward through the opening 68 in the outer fairing 62, the opening 68 in the inner fairing 64, until the replacement stator vane 66a contacts the locator pin 116.

The fixture 84a is utilized for vanes that are loaded, during a replacement procedure, first through the radially outer fairing 62 and then moved radially outward. The fixture assembly 84 is suitable for stator vane assemblies 60 where the vanes are located, in a replacement procedure, first through the opening 68 in the inner fairing 64 and moved radially outward.

Although the positioning saddles 88 and 88a are described as positioning stator vanes, the positioning saddles 88 and 88a are airfoil positioners that may be used to position other types of airfoils, such as blades.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A method of assembling a turbomachine airfoil array comprising the steps of:
   securing a partial airfoil array within a fixture, the partial airfoil array having at least one existing airfoil extending radially between an inner and an outer fairing and an open area where at least one existing airfoil has been removed;
   mounting a positioning saddle relative to a base of the fixture, the positioning saddle aligned with the open area;
   holding a replacement airfoil using the positioning saddle;
   applying a curable material at an interface between the replacement airfoil and the inner and outer fairing; and
   curing the curable material while maintaining a relative position between the replacement airfoil and the inner and outer fairing,
   wherein the positioning saddle holds the replacement airfoil by defining a first plane with at least two contact points between the positioning saddle and the replacement airfoil.

2. The method of claim 1, wherein the replacement airfoil is a stator vane.

3. The method of claim 1, further comprising defining a second plane with at least two contact points on the positioning saddle, and defining at least a portion of a third plane with at least one contact point on the saddle.

4. The method of claim 3, wherein the positioning saddle includes a first portion and a separate, second portion, the first portion having the contact points defining the first and second planes, and the second portion having the at least one contact point defining the third plane.

5. The method of claim 3, wherein the positioning saddle is selected from a group of positioning saddles, at least some of the positioning saddles within the group having contact points defining different first planes and different second planes.

6. The method of claim 1, wherein the fixture does not include positioning saddles associated with the at least one existing airfoil.

7. The method of claim 1, wherein the at least one existing airfoil is held within the fixture during curing of the curable material.

8. The method of claim 1, wherein the positioning saddle is configured to be selectively positioned at one of a plurality of circumferential positions.

9. The method of claim 1, wherein the fixture provides unobstructed areas that accommodate the existing airfoils when the partial airfoil array is secured within the fixture, the unobstructed areas lacking contact points defining planes for aligning airfoil vanes.

10. The method of claim 1, wherein the mounting is before the securing.

11. A method of assembling a turbomachine airfoil assembly, comprising the steps of:
   securing a partial airfoil array within a fixture, the partial airfoil array having at least one existing airfoil extending radially between an inner fairing and an outer fairing, and an open area where at least one existing airfoil has been removed;
   holding a replacement airfoil by defining a first plane with at least two contact points;
   applying a curable material at an interface between the replacement airfoil and the inner fairing and the outer fairing; and
   curing the curable material while maintaining a relative position between the replacement airfoil and the inner fairing and the outer fairing.

12. The method of claim 11, wherein the holding comprises holding the replacement airfoil using a positioning saddle.

13. The method of claim 12, further comprising positioning the replacement airfoil by defining the first plane with the at least two contact points on the positioning saddle, defining a second plane with at least two contact points on the positioning saddle, and defining at least a portion of a third plane with at least one contact point on the saddle, wherein the positioning saddle includes a first portion and a separate, second portion, the first portion having the contact points defining the first and second planes, and the second portion having the at least one contact point defining the third plane.

14. The method of claim 12, wherein the positioning saddle is selected from a group of positioning saddles, at least some of the positioning saddles within the group having contact points defining different first planes and different second planes.

15. The method of claim 11, wherein the replacement airfoil is a stator vane.

16. The method of claim 11, wherein the at least one existing airfoil is held within the fixture during curing of the curable material.

17. The method of claim 12, wherein the positioning saddle is configured to be selectively positioned at one of a plurality of circumferential positions.

18. The method of claim 11, wherein the fixture provides unobstructed areas that accommodate the existing airfoils when the partial airfoil array is secured within the fixture, the unobstructed areas lacking contact points defining planes for aligning airfoil vanes.

19. The method of claim 11, wherein the mounting is before the securing.

* * * * *